US008245076B2

(12) United States Patent
Schindel, Jr. et al.

(10) Patent No.: US 8,245,076 B2
(45) Date of Patent: Aug. 14, 2012

(54) METHOD AND APPARATUS FOR INITIATING CORRECTIVE ACTION FOR AN ELECTRONIC TERMINAL

(75) Inventors: William G. Schindel, Jr., Dayton, OH (US); David Eric Malone, Miamisburg, OH (US); Kevin T. McGovern, Beavercreek, OH (US)

(73) Assignee: NCR Corporation, Duluth, GA (US)

( * ) Notice: Subject to any disclaimer, the term of this patent is extended or adjusted under 35 U.S.C. 154(b) by 693 days.

(21) Appl. No.: 12/342,984

(22) Filed: Dec. 23, 2008

(65) Prior Publication Data

US 2010/0162030 A1 Jun. 24, 2010

(51) Int. Cl.

| | |
|---|---|
| ***G06F 11/00*** | (2006.01) |
| ***G06Q 40/00*** | (2006.01) |
| ***G07D 11/00*** | (2006.01) |
| ***G07F 19/00*** | (2006.01) |

(52) U.S. Cl. ................ 714/2; 714/3; 714/100; 235/379; 705/43

(58) Field of Classification Search .................... 705/35, 705/43; 714/3, 2, 100, 736; 235/375, 379–382; 371/4, 30; 709/223, 224; 717/102; 370/244, 370/253, 395

See application file for complete search history.

(56) References Cited

U.S. PATENT DOCUMENTS

| | | | | | |
|---|---|---|---|---|---|
| 5,835,911 | A * | 11/1998 | Nakagawa et al. | | 1/1 |
| 5,861,614 | A * | 1/1999 | Gardner | | 235/379 |
| 6,009,080 | A * | 12/1999 | Hanazawa | | 370/244 |
| 6,279,826 | B1 * | 8/2001 | Gill et al. | | 235/379 |
| 6,473,788 | B1 * | 10/2002 | Kim et al. | | 709/209 |
| 7,024,592 | B1 * | 4/2006 | Voas et al. | | 714/47.3 |
| 7,121,460 | B1 * | 10/2006 | Parsons et al. | | 235/379 |
| 7,472,394 | B1 * | 12/2008 | Meckenstock et al. | | 719/310 |
| 7,493,422 | B2 * | 2/2009 | Farquhar | | 710/15 |
| 7,747,527 | B1 * | 6/2010 | Korala | | 705/43 |
| 2003/0115570 | A1 * | 6/2003 | Bisceglia | | 717/101 |
| 2003/0121970 | A1 * | 7/2003 | Force et al. | | 235/379 |
| 2004/0149818 | A1 * | 8/2004 | Shepley et al. | | 235/379 |

FOREIGN PATENT DOCUMENTS

| | | | |
|---|---|---|---|
| EP | 1096374 | A2 * | 2/2001 |
| GB | 2395812 | A * | 6/2004 |

* cited by examiner

*Primary Examiner* — Ella Colbert

(74) *Attorney, Agent, or Firm* — Paul W. Martin

(57) ABSTRACT

A method and device are provided for initiating corrective actions for a terminal, such as an ATM. A method of initiating corrective actions for a terminal comprises, monitoring a fault status of a first component, detecting a fault status of the first component with a first trigger plug-in, activating a first action plug-in based upon the detected fault status of the first component, and recycling the first component.

7 Claims, 5 Drawing Sheets

METHOD AND APPARATUS FOR INITIATING CORRECTIVE ACTION FOR AN ELECTRONIC TERMINAL

BACKGROUND

Electronic terminals are well known by customers. For example, some electronic terminals may print or dispense items of value such as coupons, tickets, wagering slips, vouchers, checks, food stamps, money orders, or traveler's checks. Another common type of electronic terminal enables bank customers to engage in banking transactions without the assistance of a banking representative. These types of terminals are referred to as automated teller machines ("ATM").

The types of transactions an ATM can perform are determined by the hardware and software capabilities of the specific machine. In particular, most ATMs enable customers to withdraw cash, deposit funds, transfer funds between accounts, and pay bills, without the assistance of a customer representative. For purposes of this disclosure, references to an ATM, an automated banking machine, or an automated transaction machine shall encompass any electronic terminal, which carries out customer transactions.

Automatic teller machines typically include a card reader, a personal identification pad, a vault, a cash dispenser, a receipt provider, and a central processing unit or computer. To begin a transaction, a user inserts an identification card into the card reader and enters his or her personal identification number ("PIN") on the identification pad. The computer within the ATM verifies the accuracy of the PIN through an electronic network. If the user enters the correct PIN and the account is in good standing, the ATM completes the transaction(s) initiated by the user.

Like all computer controlled machines, ATMs may not function properly even though the user has inserted his or her identification card and provided the correct PIN. For example, the ATM may experience hardware problems if the cash dispenser or receipt provider were to become jammed or if the identification card reader were to become dirty. Additionally, some ATMs may experience software problems or faults, much like personal computers often do, that prevent users from initiating transactions. When problems or faults arise, the ATM may enter a stand-by mode that denies users access to the machine. Clearly, when in stand-by mode, ATMs become a source of frustration for operating organizations and the customers desiring to utilize the machines.

Traditionally, when an ATM experiences a problem or fault a bank representative places a telephone call or sends an electronic message to a remotely located terminal monitoring solution indicating that the ATM has experienced a technical problem. In-house technicians receive these incoming calls or messages and dispatch field technicians to each nonfunctional ATM. The field technicians travel to the faulty ATMs and conduct a series of diagnostic checks to identify the cause of the error signal. Once a technician determines the cause of the error signal, he or she initiates a corrective action to return the ATM to working order.

Sending field technicians to nonfunctional ATMs ensures that the ATMs will eventually be returned to working order; however, the process consumes time and resources. Consider that while an ATM is not working properly, customers must either search for another machine or wait for a technician to arrive at the inoperable machine, setup diagnostic equipment, attempt to solve the problem, and initiate a corrective action. Of course, the repair process consumes even more time when the technician must make multiple trips to the ATM in order to initiate a corrective action. For example, on the first trip the technician might be able to diagnose the problem; however, he or she may then have to travel back to the terminal monitoring solution to pick up the parts required to fix the ATM. Furthermore, organizations that own or rent ATMs also suffer during delays in operation caused by problems and faults. For instance, when an ATM at a bank experiences a fault, customers who can no longer use the ATM impose an increased load upon the bank tellers. Specifically, customers that would normally complete transactions at the ATM must now go inside the bank, wait in line with the other customers, and speak with a bank teller to complete the transactions. Likewise, when ATMs located within retail establishments experience faults, customers may not have access to cash, resulting in lost revenue for the store. Therefore, while field technicians may often resolve the problems experienced by ATMs the repair process places significant burdens on each involved party.

As the use of ATMs and other electronic terminals becomes more prolific, the number of problems and faults experienced by ATMs will also increase. Thus, ATMs may become a major expense and burden for organizations to service if each time faults or problems occur field technicians must travel to the ATM to diagnose and repair the problem. Therefore, it is desirable to improve the method with which ATM faults and problems are corrected.

SUMMARY

In order to address the above described needs, a method and device are provided for initiating corrective actions for a terminal, such as an ATM. In one embodiment, a method of initiating corrective actions for a terminal includes monitoring a fault status of a first component, detecting a fault status of the first component with a first trigger plug-in, activating a first action plug-in based upon the detected fault status of the first component, and recycling the first component.

In another embodiment, a terminal includes a first hardware component, a first software component, a memory, a first hardware component trigger plug-in programmed within the memory, the first hardware component trigger plug-in configured to generate a first hardware component trigger status in response to a detected fault condition of the first hardware component, a first hardware component action plug-in programmed within the memory, the first hardware component action plug-in programmed to control recycling of the first hardware component in response to a first hardware action plug-in invocation, a first software component trigger plug-in programmed within the memory, the first software component trigger plug-in programmed to generate a first software component trigger status in response to a detected fault condition of the first software component, a first software action plug-in programmed within the memory, the first software component action plug-in programmed to control a recycling of the first software component in response to a first software action plug-in invocation, and an incident reduction agent programmed within the memory, the incident reduction agent programmed to (i) recognize the first hardware component trigger status, (ii) issue the first hardware action plug-in invocation based upon the recognized first hardware component trigger status, (iii) recognize the first software component trigger status, and (iv) issue the first software action plug-in invocation based upon the recognized first software component trigger status.

In yet another embodiment, a method of operating a terminal includes generating a first hardware component trigger status in response to a detected fault condition of a first hardware component, recognizing the first hardware component trigger status, issuing a first hardware action plug-in invocation based upon the recognized first hardware component trigger status, recycling the first hardware component in response to the first hardware action plug-in invocation, generating a first software component trigger status in response to a detected fault condition of a first software component, recognizing the first software component trigger status, issuing a first software action plug-in invocation based upon the recognized first software component trigger status, and recycling the first software component in response to the first software action plug-in invocation.

DETAILED DESCRIPTION

For the purposes of the present disclosure, an automatic teller machine ("ATM") is described. It is understood, however, that the concepts disclosed herein can be applied to other types of electronic terminals, such as but not limited to, self checkout terminals, bill payment kiosks, and the like, in which a customer executes a series of steps to complete a transaction.

Figure 1:
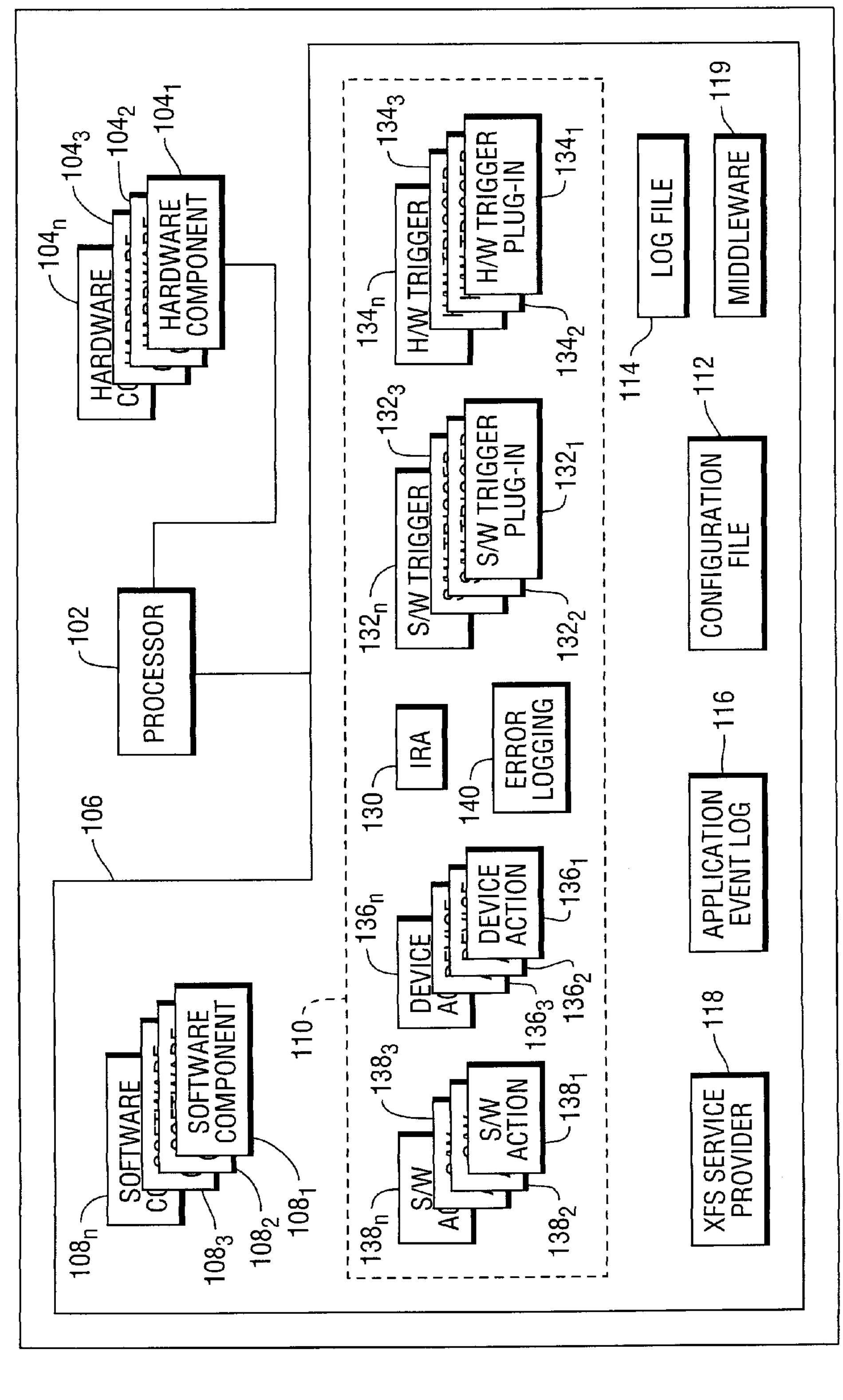
FIG. 1 illustrates, in block diagram form, a terminal of the type disclosed herein.

As illustrated in FIG. 1, a terminal 100, provided in this embodiment as an ATM, includes a processor 102, hardware components $\mathbf{104}_1$-$\mathbf{104}_n$, and a memory 106. The processor 102 may suitably be a general purpose computer processing circuit such as a microprocessor and its associated circuitry. The processor 102 is operable to carry out the operations attributed to it herein.

The illustrated hardware components $\mathbf{104}_x$ may include a currency dispenser, an envelope repository, an identification card unit, and a receipt provider. In alternative embodiments, other hardware, including other input/output (I/O) devices may be substituted and/or added to provide desired customer service functions.

The memory 106 includes software components $\mathbf{108}_1$-$\mathbf{108}_n$, a diagnostic component 110, a configuration file 112, a log file 114, an application event log 116, an XFS Service Provider 118, and a middleware component 119. The software components $\mathbf{108}_x$ include program instructions which, when executed by the processor 102, operate the hardware $\mathbf{104}_x$. The software components $\mathbf{108}_x$ may further include program instructions for establishing communications between the terminal 100 and other components in a network.

Figure 2:
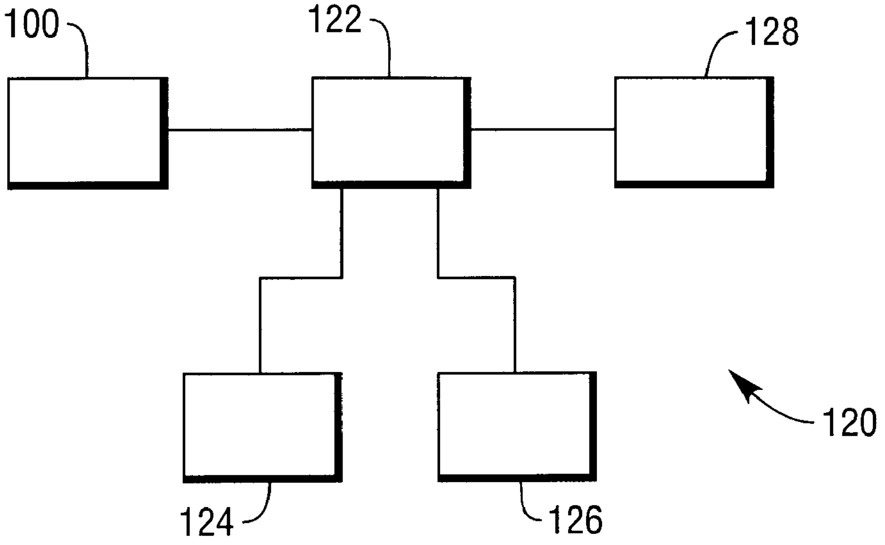
FIG. 2 illustrates, in block diagram form, the terminal of FIG. 1 electronically connected to a remote monitoring solution through a communications link.

By way of example, FIG. 2 depicts a network 120 wherein the terminal 100 is linked with a remote monitoring solution 122. The various components within the network 120 may be linked by any desired form of electronic communication, both wired and wireless, such as the Internet, small area networks, and large area networks. The remote monitoring solution 122 is an organization which monitors and coordinates repair and maintenance of the terminal 100. The remote monitoring solution 122 may include a plurality of personal computers configured to monitor the fault status of the terminal 100. The remote monitoring solution 122 also monitors and coordinates repair and maintenance of terminals 124, 126, and 128. The terminals 124, 126, and 128 may be configured to provide the same or different customer service functions as the terminal 100.

Returning to FIG. 1, the diagnostic component 110 includes an incident reduction agent ("IRA") 130, software trigger plug-ins $\mathbf{132}_1$-$\mathbf{132}_n$, hardware trigger plug-ins $\mathbf{134}_1$-$\mathbf{134}_n$, device action plug-ins $\mathbf{136}_1$-$\mathbf{136}_n$, software action plug-ins $\mathbf{138}_1$-$\mathbf{138}_n$, and an error logging module 140. These programs within the diagnostic component 110 are executed to detect and resolve problems with the hardware $\mathbf{104}_x$ and software components $\mathbf{108}_x$.

The IRA 130 acts as an interface between each of the programs stored in the diagnostic component 110. In one embodiment, the IRA 130 is a Microsoft Windows Installer ("MSI") file that installs a Java Runtime Environment. The install method utilized by the IRA 130 may also be implemented in other programming languages as may be required by the terminal 100. Once installed, the IRA 130 may be configured to load automatically upon booting of the terminal 100. The IRA 130 is preferably configured not to interfere substantially with the provision of customer services by the terminal 100.

The software trigger plug-ins $\mathbf{132}_x$, hardware trigger plug-ins $\mathbf{134}_x$, device action plug-ins $\mathbf{136}_x$, and software action plug-ins $\mathbf{138}_x$ are programs stored in the diagnostic component 110 that either detect when a fault has occurred or issue a corrective action to remedy a fault. In one embodiment, each of the software trigger plug-ins $\mathbf{132}_x$, hardware trigger plug-ins $\mathbf{134}_x$, device action plug-ins $\mathbf{136}_x$, and software action plug-ins $\mathbf{138}_x$ are written in Microsoft Visual Basic.NET format and utilize XFS CEN 2.0-3.0 compatible system level events to determine if a fault has occurred. If desired, however, one or more of the software trigger plug-ins $\mathbf{132}_x$, hardware trigger plug-ins $\mathbf{134}_x$, device action plug-ins $\mathbf{136}_x$, and software action plug-ins $\mathbf{138}_x$ may be programmed in any other language.

The software trigger plug-ins $\mathbf{132}_x$ monitor the software components $\mathbf{108}_x$ for faults and errors. Each software trigger plug-in $\mathbf{132}_x$ in this embodiment is programmed to monitor a respective software component $\mathbf{108}_x$. The nature of the respective software component $\mathbf{108}_x$ may be adjusted for different applications. For example, a software component $\mathbf{108}_x$ may be the complete operating program for a particular hardware component or the software component $\mathbf{108}_x$ may be one of a number of subroutines within an operating program. Thus, the diagnostic component 110 may include, for example, a separate software trigger plug-in $\mathbf{132}_x$ for each operating program or for each subroutine within an operating program. Thus, different levels of monitoring activity are possible.

The hardware trigger plug-ins $\mathbf{134}_x$ monitor the hardware components $\mathbf{104}_x$ for faults and errors. In this embodiment, each hardware trigger plug-in $\mathbf{134}_x$ is programmed to monitor a specific assembly of hardware $\mathbf{134}_x$, which may include a currency dispenser, an envelope depositor, an identification card unit, a receipt provider, or any other hardware assembly associated with the terminal 100.

The device action plug-ins $\mathbf{136}_x$ are programs that initiate corrective actions in the hardware components $\mathbf{104}_x$. Each device action plug-in $\mathbf{136}_x$ is programmed to issue a command to recycle the associated mechanical elements. The fault status of the associated hardware component $104_x$ is also cleared in response to the execution of a device action plug-in $136_x$. In this embodiment, the diagnostic component 110 includes separate device action plug-ins $136_x$ for each hardware component $104_x$ which may be a currency dispenser, an envelope depository, an identification card unit, or a receipt provider.

The software action plug-ins $138_x$, when executed, cause an associated software component $108_x$ to be rebooted. The process of stopping and restarting a software component $108_x$ is herein referred to as "rebooting" the software component $108_x$. Rebooting of software components is commonly performed when a software component is not operating as desired since many error or fault conditions do not require the software component to be reprogrammed; instead, simply stopping and then restarting the software component may clear the error or fault.

The software action plug-in $138_x$ may be programmed to stop and restart the operating system of the terminal 100 whenever any software component $108_x$ has experienced an error or fault rather than rebooting the faulted software component $108_x$. The operating system of the terminal 100 is a program that coordinates the operation of each software component $108_x$. Therefore, rebooting the operating system may cause every software component $108_x$ to reboot. Operating systems that may be incorporated into the terminal 100 include any version of Microsoft Windows or Apple OS, and even propriety operating systems exclusive to terminal 100.

The error logging module 140 is a program that is executed concurrently with the IRA 130. The error logging module 140 is a configurable module, which records the details of each fault signal detected by the software trigger plug-ins $132_x$ and the hardware trigger plug-ins $134_x$ in the log file 114. Recorded details may include the type of fault detected, the date and time the fault occurred, and other details as may be required by the remote monitoring solution 122.

Referring still to FIG. 1, the application event log 116 is an electronic file that records each action attempted by the device action plug-ins $136_x$ and the software action plug-in $138_x$. Each entry in the application event log 116 may include the identity of the software trigger plug-in $132_x$ or hardware trigger plug-in $134_x$ that detected the fault, the identity of the faulty software component $108_x$ or hardware component $104_x$ the type of fault detected, the action taken by the device action plug-in $136_x$ or the software action plug-in $138_x$, the number of times a device action plug-in $136_x$ has been activated in the current calendar day or other predefined period, and the time the fault occurred. Of course, other information may be included in other embodiments of an electronic terminal.

The configuration file 112 is a user configurable electronic file which determines the operating characteristics of the programs stored in the diagnostic component 110. For example, the configuration file 112 may be programmed with command instructions which, when executed by the processor 102, control which action plug-ins $104_x$ are activated in response to a detected fault. In one embodiment, the configuration file 112 may be an extensible markup language ("XML") file; however, the configuration file 112 may be implemented in any programming language utilized by the terminal 100.

The XFS Service Provider 118 is a program stored in the diagnostic component 110 that permits programs developed by manufacturers other than the terminal 100 manufacturer to operate on the terminal 100. Any or all of the hardware components $104_x$ and the software components $108_x$ may be configured to require invocation of the XFS Service Provider 118 for communication with the processor 102.

The middleware 119 is a program stored in the memory 106 that is used to configure signals generated using the XFS Service Provider 118 to signals compatible with the IRA 130. In this embodiment, the middleware 119 is Americas' APTRA Edge middleware.

Figure 3:
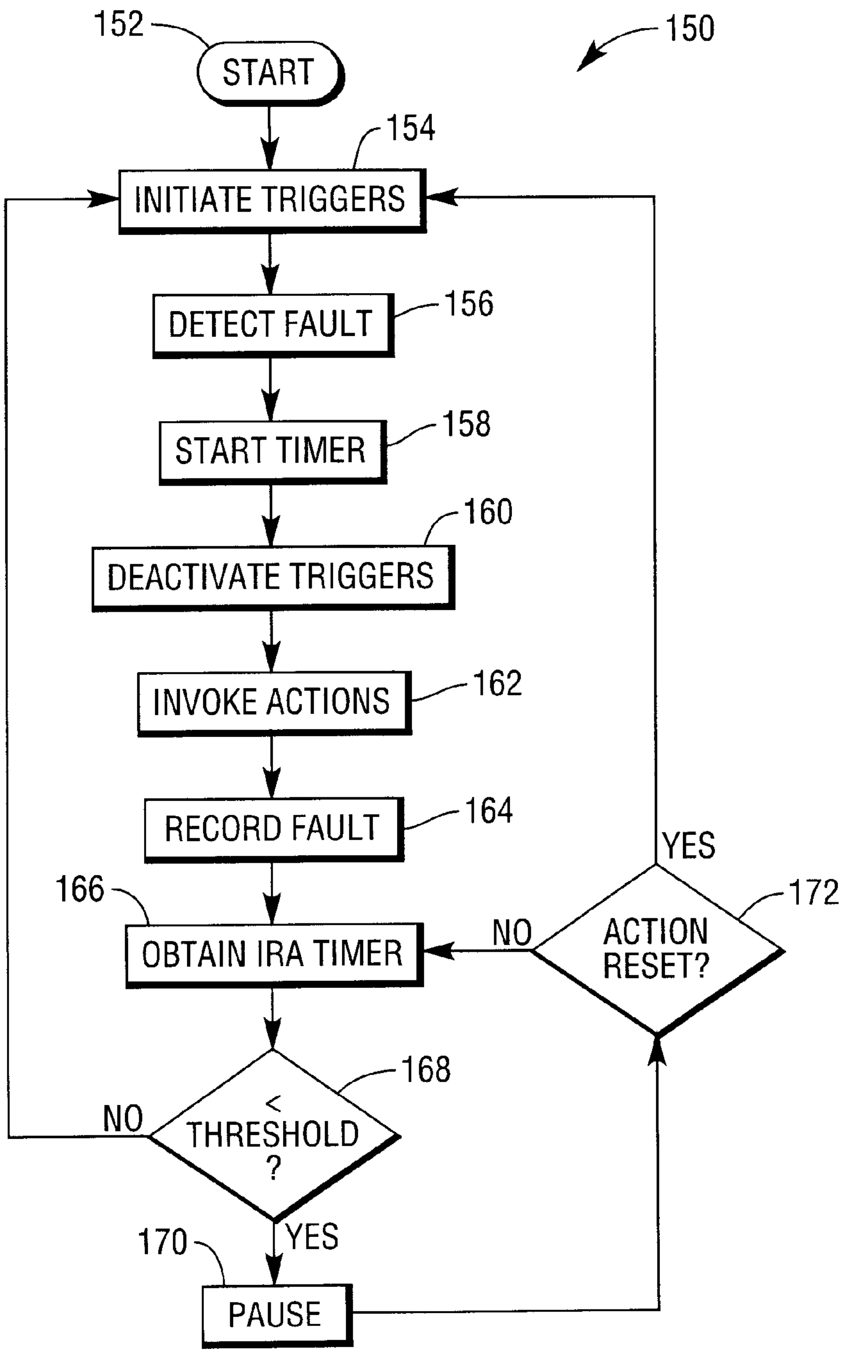
FIG. 3 depicts a process flowchart illustrating the actions controlled by an incident reduction agent in an exemplary method for initiating corrective actions in a terminal as illustrated in FIG. 1.

In one embodiment, the memory 106 includes command instructions which, when executed by the processor 102, cause the procedure 150 of FIG. 3 to be performed. When the terminal 100 is energized (block 152), the processor 102 executes the IRA 130 and the software trigger plug-ins $132_n$ and the hardware trigger plug-ins $134_n$ are initiated. In this embodiment, each of the software trigger plug-ins $132_x$ and the hardware trigger plug-ins $134_x$ may be individually enabled. Accordingly, at block 154, each enabled software trigger plug-in $132_x$ and hardware trigger plug-in $134_x$ is initiated.

Once the IRA 130 initiates the software trigger plug-ins $132_x$ and the hardware trigger plug-ins $134_x$, the software trigger plug-ins $132_x$ and the hardware trigger plug-ins $134_x$ monitor the fault status of the hardware $104_N$ and the software $108_N$ either directly or through the XFS Service Provider 118. The software trigger plug-ins $132_x$ and the hardware trigger plug-ins $134_x$ are event driven. Accordingly, when there is no fault event, the software trigger plug-ins $132_x$ and the hardware trigger plug-ins $134_x$ remain idle so as to conserve processing time of the processor 102.

In the event of a fault, which in this example is in a component which communicates with the terminal 100 through the XFS Service Provider 118, the XFS Service Provider 118 receives an error signal from the faulted software component $108_x$ or hardware component $104_x$. A coded message including the identity of the faulted software component $108_x$ or hardware component $104_x$ along with an M-Status and error pair indicating the severity of the fault is evaluated by each of the software trigger plug-ins $132_x$ and the hardware trigger plug-ins $134_x$. Specifically, the software trigger plug-ins $132_x$ and the hardware trigger plug-ins parse the M-Status and error severity out of a vendor specific field of the XFS Service Provider 118 error event.

If the M-Status and severity of the error match one of the configured M-Status-severity pairs stored in the configuration file 112, or if the vendor specific field is blank (block 156), a software trigger plug-in $132_x$ or a hardware trigger plug-in $134_x$ associated with the faulted component signals to the IRA 130 that a fault has occurred. The output of the software trigger plug-in $132_x$ or hardware trigger plug-in $134_x$ identifies the software component $108_x$ or hardware component $104_x$ that has faulted along with the specific fault detected.

In response, the IRA 130 initiates an IRA timer (block 158) and deactivates all of the software trigger plug-ins $132_x$ and the hardware trigger plug-ins $134_x$. Deactivation of the software trigger plug-ins $132_x$ and the hardware trigger plug-ins $134_x$ allows corrective action for the identified fault to be undertaken without interruption from other triggered events. The IRA 130 also invokes each of the software action plug-ins $138_x$ and the device action plug-ins $136_x$ (block 162).

Additionally, an entry is made in the log file 114 (block 164) that identifies the software component $108_x$ or hardware component $104_x$ that has faulted along with the specific fault detected. Additional information may also be recorded about each fault as dictated by the type of terminal 100 and the nature of the monitored component that is faulted. The log entry in this embodiment is controlled by the error logging module 140. In alternative embodiments, the IRA 130 or a plug-in may control the logging function.

The IRA 130 then obtains the value of the IRA timer (block 166) and determines if the obtained value is greater than a predetermined threshold (block 168). In the event the IRA timer value exceeds the predetermined threshold, the process 150 continues at block 154. The purpose of this comparison is to allow the remaining software triggers 132$_x$ and hardware triggers 134$_x$ to continue to function in the event the action plug-in associate with a particular trigger plug-in is not working. Thus, the threshold should be selected to allow the action plug-in events discussed below to be performed.

If the threshold has not been exceeded, the process pauses (block 170). Then, if a system reset has not been issued (block 172), the process continues to obtain a new value of the IRA timer (block 166) and proceeds to block 168. If a system reset has been issued (block 172), then the process continues to block 154.

Figure 4:
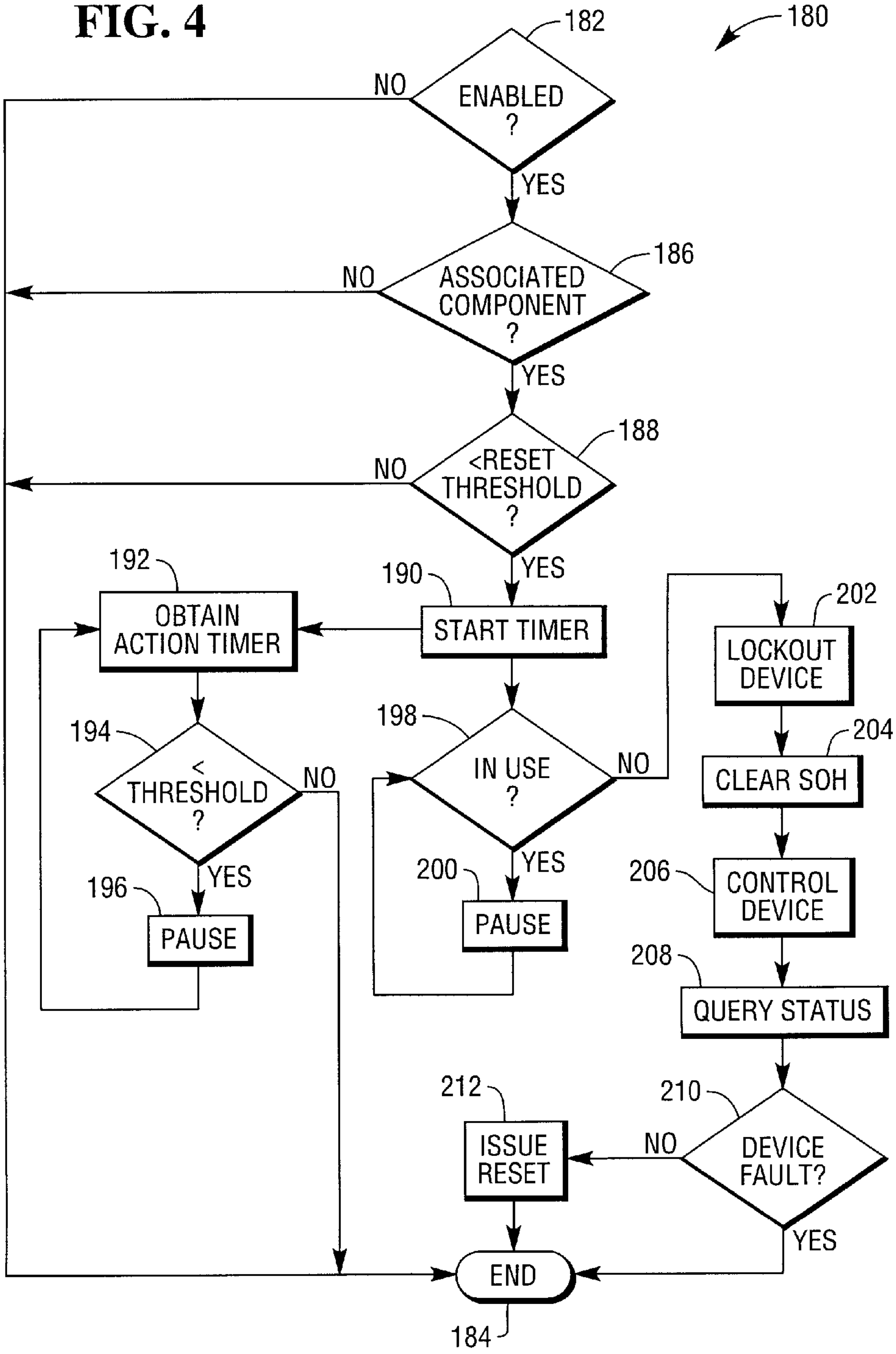
FIG. 4 depicts a process flowchart illustrating the actions controlled by a device action plug-in in the method for initiating corrective actions in a terminal as illustrated in FIG. 3.

The response of the software action plug-ins 138$_x$ and the device action plug-ins 136$_x$ once invoked (block 162) is discussed with reference to FIGS. 4 and 5. With initial reference to FIG. 4, each of the device action plug-ins 136$_x$ executes the procedure 180. Initially, the IRA 130 determines if the device action plug-in 136$_n$ is enabled (block 182). If not, then the procedure 180 for that device action plug-in 136$_x$ ends (block 184).

If the device action plug-in 136$_x$ is enabled (block 182) then the device action plug-in 136$_x$ analyzes the output of the software trigger plug-in 132$_x$ or hardware trigger plug-in 134$_x$ (block 156). If the device action plug-in 136$_x$ is not associated with the faulted component identified in the output of the software trigger plug-in 132$_x$ or hardware trigger plug-in 134$_x$ (block 156), the procedure 180 for that device action plug-in 136$_x$ ends (block 184). Otherwise, the procedure 180 continues to block 188.

At block 188, the device action plug-in 136$_x$ determines if the total number of resets for the faulted device is less than a predetermined reset threshold. If not, then the procedure 180 ends (block 184). This reset threshold establishes the maximum number of times per day, or per other predetermined period, that a particular device may be reset. If this reset threshold is exceeded, then the faulted device is exhibiting a condition which should be further evaluated prior to returning the faulted device to service.

If the reset threshold is not exceeded (block 188), then a device action timer is initiated (block 190). The procedure 180 then follows two parallel activities. In one activity, the amount of time that is spent attempting to reset the faulted device is limited. Accordingly, the action timer value is obtained (block 192) and compared to a predetermined action threshold (block 194). If the action timer value exceeds the predetermined action threshold (block 194), then the procedure 180 ends (block 184). If the action timer value does not exceed the predetermined action threshold (block 194), then after a pause (block 196), this leg of the procedure 180 continues at block 192.

The other parallel activity of the procedure 180 checks to ascertain whether or not the terminal 100 is in a supervisory mode or in use by a customer (block 198). Specifically, the terminal 100 may be placed in a service mode when a field technician is performing maintenance or trying to diagnose a problem or fault. When in service mode, the terminal 100 may provide a field technician access to the diagnostic component 110, as an aide in repairing the terminal 100. Thus, to avoid a loss of data and to permit the field technician to properly diagnose a problem or fault, the IRA 130 may be configured to initiate a delay repeatedly until the terminal 100 is no longer in service mode (block 200). An exemplary delay may be thirty seconds.

The IRA 130 may also initiate a delay if the terminal 100 is in use by a customer when a fault or error occurs. Since the procedure 180 will affect at least some of the devices associated with the terminal 100 during this leg of the procedure 180, the IRA 130 may delay further actions in the procedure 180 to avoid a loss of customer data, and to minimize customer inconvenience. The procedure 180 continues to block 202 when the terminal 100 is no longer in use by a customer.

The device action plug-in 136$_x$ then generates commands to lock out one or more devices of the terminal 100 from normal operational control. In some instances, the entire terminal 100 may be disabled from providing services to customers. In other instances, only the faulted device may be disabled from providing services to customers. In any event, the status of the faulted device is set as not available for use.

The state of health flags for the faulted device are then reset or cleared (block 204). This does not change the status of the faulted device as not being available for use. Rather, resetting the health flags allows the faulted device to generate another fault indication as discussed below. The faulted device is then controlled to physically recycle the device (block 206). Physically recycling a device refers to sending a signal to a hardware component 104$_n$ that prepares the device for operation or eliminates mechanical failures. For example, if the receipt provider experiences a paper jam, receipt provider may be controlled to operate in a reverse direction for a period of time, and the operated in a forward direction for a period of time. Physically recycling the receipt provider may cause the receipt provider to expel a portion of paper that has caused the jam.

The status of the faulted device is then queried (block 208). The faulted device then, for example, performs a self test and the results of the self test are directed to the device action plug-in 136$_x$. If the self test generates a fault condition (block 210) the procedure 180 ends (block 184). If no fault condition is generated (block 210), then the faulted device has been corrected. Accordingly, the device action plug-in 136$_x$ resets the status of the faulted device and notifies the terminal 100 that the previously faulted device may be further queried (block 212). The procedure 180 then ends (block 184).

The procedure 180 may thus be terminated at various points. Termination from block 182 or block 186 does not change the operational status of the terminal 100 or any of the devices therein. Thus, the fault will not be corrected. The fault will also not be corrected if termination of the procedure 180 is initiated from either block 188, 194, or directly from block 210, although an attempt was made to correct the presently detected fault. If the procedure terminates from block 212, the faulted device has been corrected.

Figure 5:
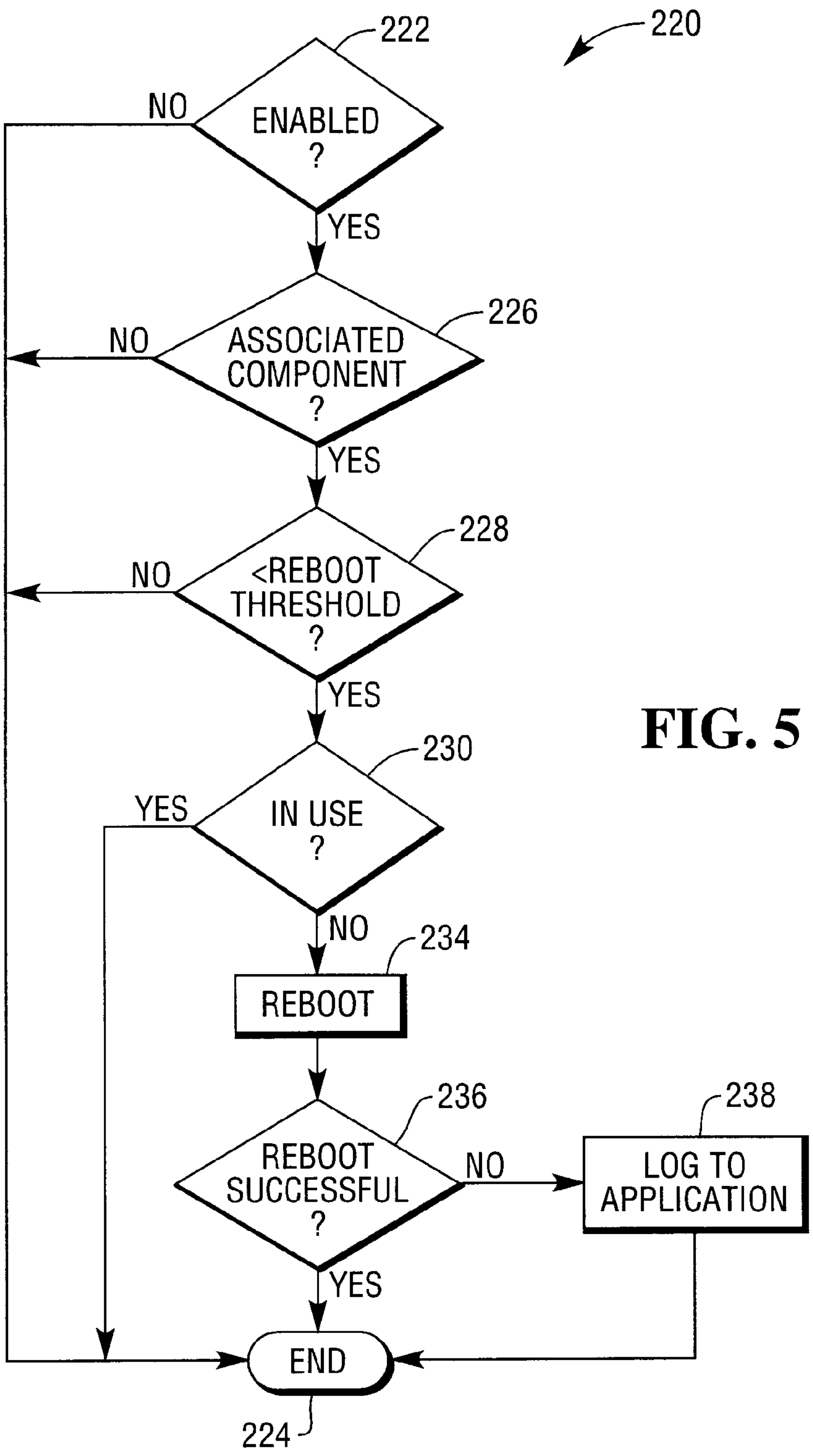
FIG. 5 depicts a process flowchart illustrating the actions controlled by a software action plug-in in the method for initiating corrective actions in a terminal as illustrated in FIG. 3.

With reference to FIG. 5, each of the software action plug-ins 138$_x$ executes the procedure 220 when invoked (block 162). Initially, the IRA 130 determines if the software action plug-in 138$_x$ is enabled (block 222). If not, then the procedure 220 for that software action plug-in 138$_x$ ends (block 224).

If the software action plug-in 138$_x$ is enabled (block 222) then the software action plug-in 138$_x$ analyzes the output of the software trigger plug-in 132$_x$ or hardware trigger plug-in 134$_x$ (block 226). If the software action plug-in 138$_x$ is not associated with the faulted component identified in the output of the software trigger plug-in 132$_x$ or hardware trigger plug-in 134$_x$ (block 226), the procedure 220 for that software action plug-in 138$_x$ ends (block 224). Otherwise, the procedure 220 continues to block 228. If desired, a number of different software trigger plug-ins 132$_x$ may be associated with a single software action plug-in 138$_x$.

At block 228, the software action plug-in 138$_x$ determines if the total number of reboots for the faulted software is less than a predetermined reboot threshold. If not, then the procedure 220 ends (block 224). This reboot threshold establishes the maximum number of times per day, or per other predetermined period, that a particular software component 108$_x$ may be reset. If this reboot threshold is exceeded, then the faulted software component 108$_x$ is exhibiting a condition which should be further evaluated prior to returning the faulted software component 108$_x$ to service.

If the reboot threshold is not exceeded (block 228), then the procedure 220 checks to ascertain whether or not the terminal 100 is in a service or supervisory mode (block 230). Specifically, the terminal 100 may be placed in a service mode when a field technician is performing maintenance or trying to diagnose a problem or fault. When in service mode, the terminal 100 may provide a field technician access to the diagnostic component 110, as an aide in repairing the terminal 100. Thus, to avoid a loss of data and to permit the field technician to properly diagnose a problem or fault, the IRA 130 may be configured to end (block 224) if the terminal is in service mode (block 230).

If the terminal 100 is not in service mode (block 230), the software action plug-in 138$_x$ generates commands to reboot the associated software component 108$_x$ (block 234). Once the software component 108$_x$ reboots, the software action plug-in 138$_x$ generates commands to verify the operating condition of the software component 108$_x$ (block 236). If the software component 108$_x$ is operating properly, the process 220 ends (block 224). If the software component 108$_x$ is not operating properly, then a log entry to the application event log is generated (block 238). The procedure 220 then ends (block 224).

The specific embodiment described above may be modified to provide a number of alternative functions. By way of example, in one alternative embodiment, the processor 102 selectively initiates the software trigger plug-ins 132$_x$ and the hardware trigger plug-ins 134$_x$. The timing and duration of initiation may be controlled by variables in the configuration file 112. Thus, different trigger plug-ins may be operated at different periodicities.

Additionally, while in the embodiment described above all of the software action plug-ins 138$_x$ and the device action plug-ins 136$_x$ are invoked upon detection of a fault, in alternative embodiments, only a selected one or group of action plug-ins 138$_x$ and device action plug-ins 136$_x$ are invoked, depending upon the nature of the fault.

Additionally, different strategies may be invoked upon detection of a faulted component. For example, only certain types or severities of faults may result in pausing further trigger event. Moreover, in addition to logging fault events, reporting of the fault events and the corrective actions attempted may be transmitted over the network 120 to the remote monitoring solution.

The manner in which the forgoing procedures are implemented may also be varied. In one embodiment, the device action plug-ins 136$_x$ and the software action plug-ins 138$_x$ include nodes configurable through the configuration file 112. For example, the device action plug-ins 136$_x$ and the software action plug-ins 138$_x$ may contain "max_actions," and "action_timeout" nodes. The "max_actions" node may be used to determine the maximum number of recycle or reboot attempts that a device action plug-in 136$_x$ or software action plug-in 138$_x$ initiates in a calendar day or other predetermined period.

Additionally, device action plug-ins 136$_x$ and the software action plug-ins 138$_x$ may contain an "action_timeout" node which represents the maximum time in seconds that the respective device action plug-ins 136$_x$ and software action plug-ins 138$_x$ are allowed to attempt to recycle or reboot a hardware component 104$_x$ or software component 108$_x$ before the action is cancelled. The configuration file 112 is suitable to configure other nodes as required by the type of terminal 100 being monitored.

Similarly, the software action plug-ins 138$_x$ may include configurable nodes to ensure that that the terminal 100 only reboots in desired situations. Thus, a software action plug-in 138$_x$ may include a "boot_N" node that counts the number of times in a calendar day that the IRA 130 has activated the software action plug-in 138$_x$.

Additionally, the software action plug-in 138$_x$ may include a "max_Boot" node that limits the number of times the terminal 100 may be rebooted in a calendar day. The daily or other limit prevents the IRA 130 from continuously rebooting the terminal 100 in an attempt to clear a fault that cannot be cleared automatically by the IRA 130.

Finally, the software action plug-in 138$_x$ may include a "trans" node that indicates when the terminal 100 is engaged in a user transaction or is in service mode. The node thus prevents the software action plug-in 138$_x$ from rebooting the terminal 100 when a user is engaged in a transaction or the terminal 100 is being serviced, thereby ensuring a reboot does not cause an erroneous transaction or a loss in data. The software action plug-in 138$_x$ may also contain other nodes as determined by the requirements of the terminal 100.

While this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

What is claimed is:

1. A method of operating a terminal comprising:
- generating a first hardware component trigger status in response to receipt of a fault condition of a first hardware component by a processor of the terminal;
- recognizing the first hardware component trigger status by the processor;
- issuing a first hardware action plug-in invocation based upon the recognized first hardware component trigger status by the processor;
- recycling the first hardware component in response to the first hardware action plug-in invocation by the processor;
- generating a first software component trigger status in response to receipt of a fault condition of a first software component by the processor;
- recognizing the first software component trigger status by the processor;
- issuing a first software action plug-in invocation based upon the recognized first software component trigger status by the processor; and
- rebooting the first software component in response to the first software action plug-in invocation by the processor including determining that the terminal is being used by a customer, and delaying recycling of the first hardware component until the terminal is no longer being used by the customer.

2. The method of claim 1, wherein recycling the first software component comprises:

determining the number of recycle events for the first software component within a predetermined period of time; and comparing the determined number of recycle events to a predetermined threshold.

3. The terminal of claim 1, wherein controlling the rebooting of the first software component comprises:

rebooting the first software component;

determining that the rebooted first software component is operational; and generating a first software component operational status in response to the operational determination.

4. The method of claim 3, further comprising:

generating a second hardware component trigger status in response to a detected fault condition of a second hardware component;

recognizing the second hardware component trigger status;

issuing a second hardware action plug-in invocation based upon the recognized second hardware component trigger status; and recycling the second hardware component in response to the second hardware action plug-in invocation.

5. The method of claim 4, further comprising:

generating a second software component trigger status in response to a detected fault condition of a second software component;

recognizing the second software component trigger status;

issuing a second software action plug-in invocation based upon the recognized second software component trigger status; and rebooting the second software component in response to the second software action plug-in invocation.

6. The method of claim 1, wherein rebooting the first software component comprises:

rebooting an operating system of the terminal by the processor.

7. An operating terminal comprising:

a first hardware component;

a first software component;

a memory;

a processor configured to generate a first hardware component trigger status in response to receipt of a fault condition of the first hardware component;

recognize the first hardware component trigger status;

issue a first hardware action plug-in invocation based upon the recognized first hardware component trigger status;

recycle the first hardware component in response to the first hardware action plug-in invocation;

generate a first software component trigger status in response to receipt of a fault condition of the first software component;

recognize the first software component trigger status;

issue a first software action plug-in invocation based upon the recognized first software component trigger status; and reboot the first software component in response to the first software action plug-in invocation, including determine that the terminal is being used by a customer, and delay recycling of the first hardware component until the terminal is no longer being used by the customer.

* * * * *